(No Model.)  2 Sheets—Sheet 1.

C. F. ROPER.
METAL SCREW MACHINE.

No. 263,358.  Patented Aug. 29, 1882.

Witnesses
Fred A. Powell
John F. C. Plunkett

Inventor.
Charles F. Roper
by Crosby & Gregory attys.

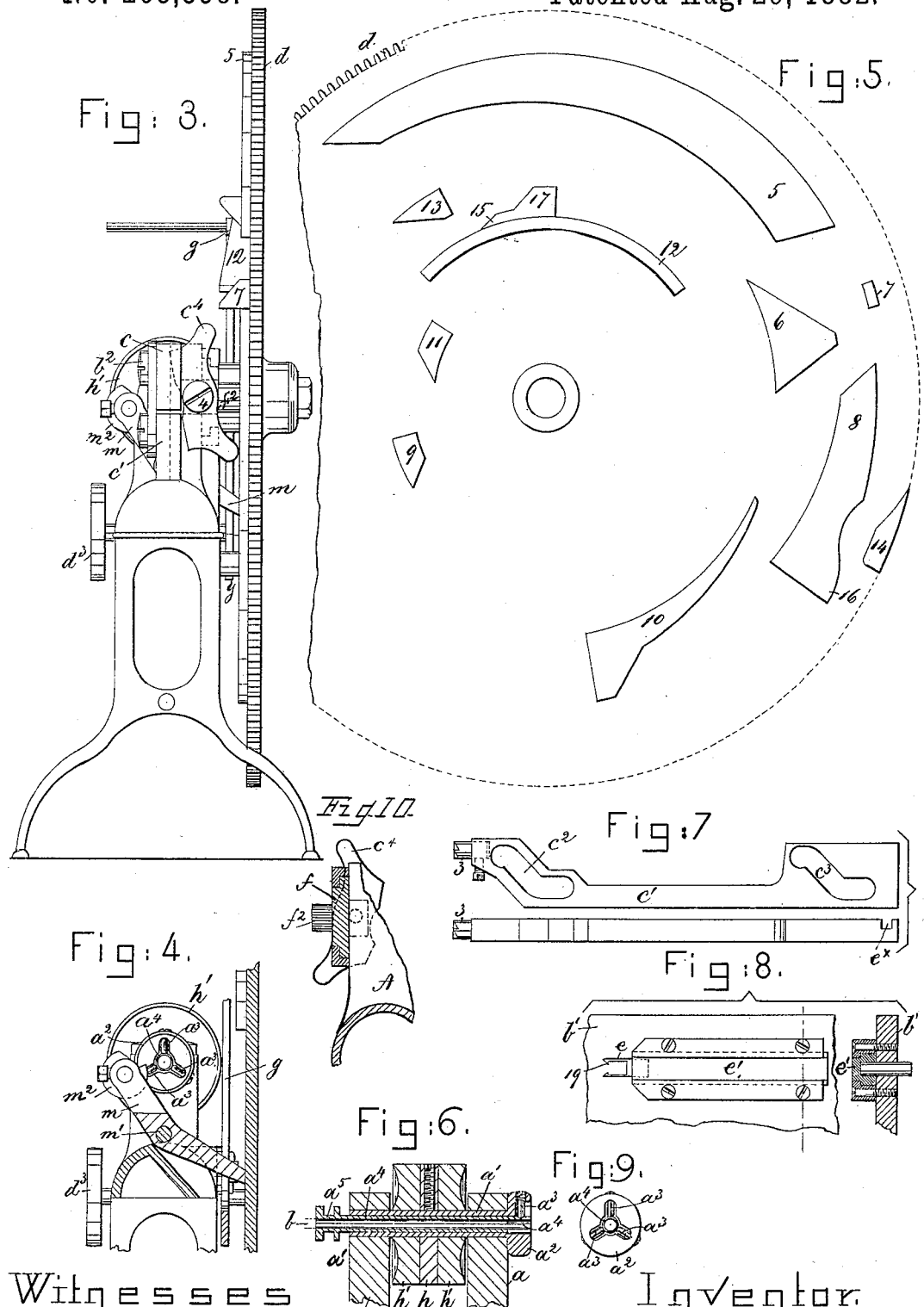

UNITED STATES PATENT OFFICE.

CHARLES F. ROPER, OF BOSTON, MASSACHUSETTS.

METAL-SCREW MACHINE.

SPECIFICATION forming part of Letters Patent No. 263,358, dated August 29, 1882.

Application filed June 5, 1882. (No model.)

*To all whom it may concern:*

Be it known that I, CHARLES F. ROPER, of Boston, county of Suffolk, State of Massachusetts, have invented an Improvement in Metal-Screw Machines, of which the following description, in connection with the accompanying drawings, is a specification.

My invention relates to that class of screw-cutting machines adapted to automatically form a screw at the end of a rotating rod held by a suitable chuck.

My invention consists in a novel tool-carrier, and in means for operating it. The said tool-carrier, two or more of which may be employed in the same machine, as may be desired, consists of a longitudinally-sliding bar having its forward end, which receives the tool, bent or turned inward toward the center of rotation of the chuck and rod, the said bar being slotted diagonally and receiving in said slot a fixed pin, whereby as the bar is moved longitudinally it is also moved radially toward and from the center of rotation of the said chuck and rod, thus placing the tool fast upon the end of the bar in operative position in front of the end of the rod as the bar is moved forward, the said tool and bar being withdrawn and moved outwardly from the center of rotation of the chuck and rod by the reverse or backward movement of the bar. The movement of the tool-carrying bar is a compound one—i. e., a diagonal forward movement to place the tool in line with the rod, and then a straight forward movement while the tool is in line with the end of the rotating rod and performing its work, after which the tool-carrying bar is moved backward in its inward position and withdrawn off from the rod, and is then moved diagonally backward and outward. I have combined this novel tool-carrying bar with a rotating chuck and other devices, as will be fully pointed out at the end of this specification.

Figure 1:
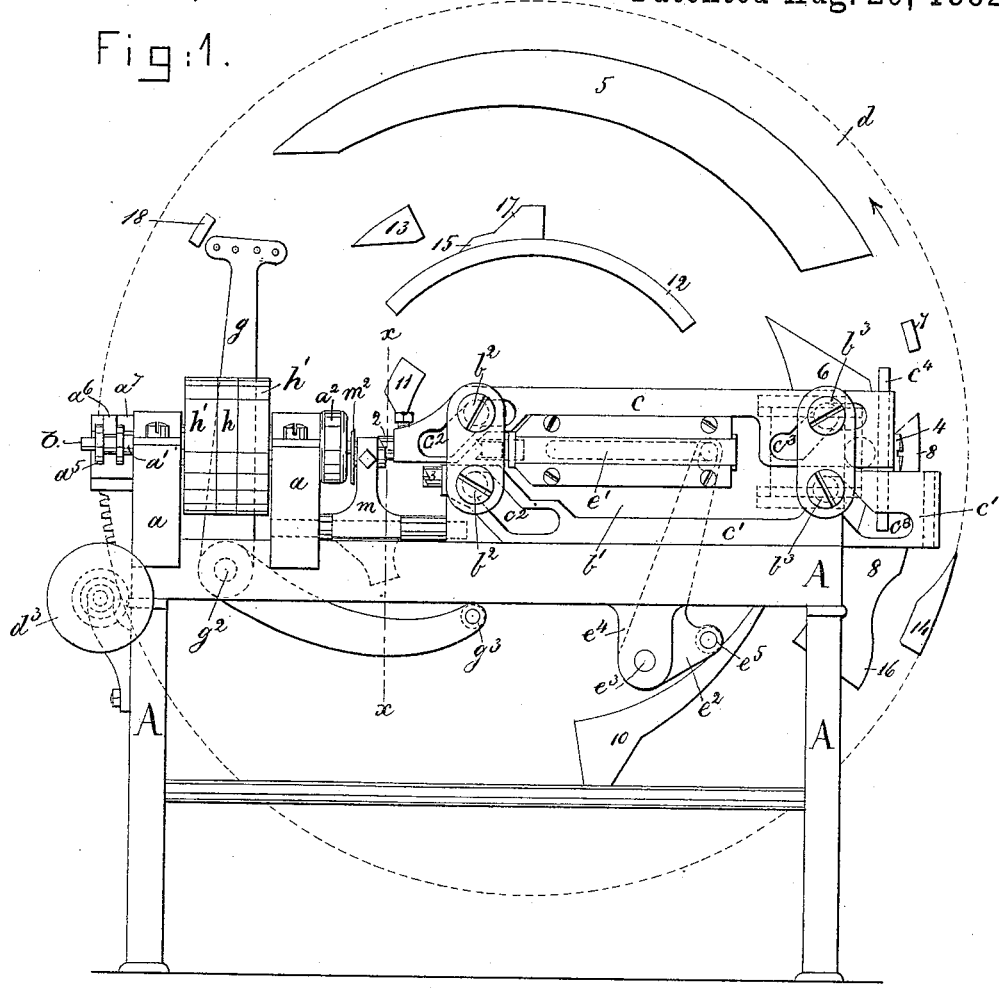
Figure 2:
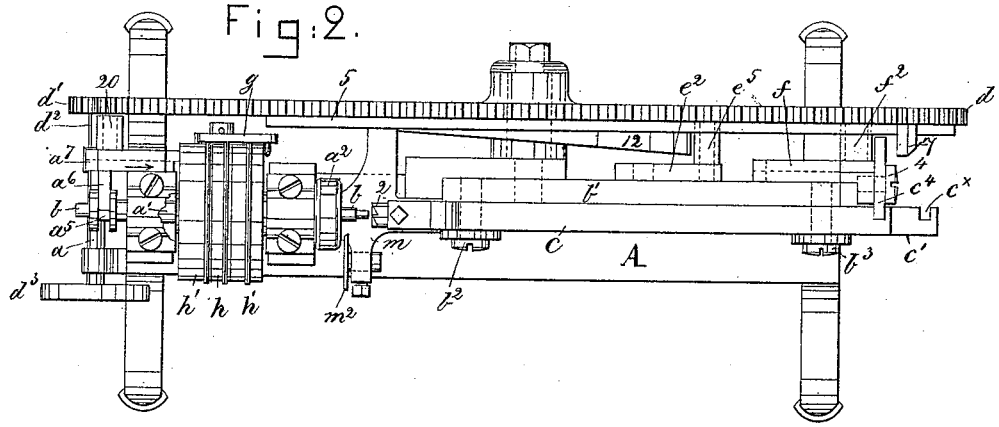

Figure 1 represents in side elevation a sufficient portion of a screw-making machine to illustrate my present invention; Fig. 2, a top view thereof; Fig. 3, a rear end view; Fig. 4, a section on the line $x\, x$, Fig. 1, showing the cutting-off tool and its actuating mechanism; Fig. 5, a detail showing that portion of the main actuating-cam-carrying plate or disk which is not fully shown in Fig. 1. Fig. 6 is a sectional detail of the chuck; Fig. 7, a detail showing one of the tool-carrying bars; Fig. 8, a detail of the feeding device for the rod. Fig. 9 is a front view of the chuck, and Fig. 10 a sectional detail view of the carriage and attached bar-moving device.

The frame-work A of the machine has upon it bearings $a\, a$ for the hollow shaft $a'$, forming part of the chuck for rotating the rod $b$, the remaining part of the chuck being the head $a^2$, the struts $a^3$, and the split tube $a^4$, having a collar, $a^5$, embraced by a fork, $a^6$, connected with a slide, $a^7$, having a short longitudinal movement sufficient to give to the tube $a^4$ enough movement parallel with the rod to cause the connected struts, by their change of inclination, to force the split end of the tube with more or less force against the rod, so as to cause it to be rotated positively by the chuck, or to be left at rest, or to be released to be fed through the chuck.

The chuck herein shown and thus far described briefly is substantially the same as in application No. 58,627, to which reference may be had; but instead of this chuck, I might employ any other well-known chuck.

The frame-work has rising from it a standard, $b'$, having fixed to it guide-pins or studs $b^2\, b^3$, which in practice will have upon them suitable anti-friction rolls.

Each tool-carrying bar $c\, c'$ is composed of a reciprocating bar, having guiding-surfaces, parts of which are inclined with relation to and other parts of which are parallel with the axis of rotation of the shaft $a'$ of the chuck. As herein shown, the said inclined surfaces are represented as formed by providing the said bars with inclined slots $c^2\, c^3$, and the parts of the guiding-surfaces which are parallel with the shaft $a'$ are the straight surfaces produced by forming the straight parts of the said slots in front and rear of the inclined parts thereof, as fully shown in Fig. 7. The slots $c^2$ $c^3$ receive the studs $b^2\, b^3$, which latter, acting with the said inclined and parallel bearing-surfaces, support the said bars $c\, c'$, and so guide and direct the same that while being reciprocated longitudinally parallel with the axis of the shaft $a'$ or the axis of rotation of the chuck and rod carried by it the said bars are also gradually moved radially toward and from the axis of rotation of the chuck and the rod. In other words, the slots are so shaped that when a tool-carrying bar is in its most backward position, as shown by bar $c'$ in Fig. 1, the tool attached to the bent forward end thereof is removed radially or diagonally from the center of rotation of the chuck and rod. As a tool-carrying bar is moved forward from the position of bar $c'$ the diagonal parts of the slots $c^2$ $c^3$, acting on the studs $b^2$ $b^3$, cause the said bar to take a diagonal direction or to move radially toward the center of rotation of the chuck and rod. The bar $c$ in Fig. 1 is shown as having been so moved forward to bring the threading-tool 2 carried by it opposite or in line with the end of the rod. Further forward movement of the bar $c$ from the position Fig. 1, the studs $b^2$ $b^3$ then being in the horizontal parts of the slots, results in a horizontal or straight-line movement of the tool-carrying bar, such a movement as is necessary to properly run the tool upon the rod. The bar $c'$ carries the reducing-tool 3. The straight parts of the slots in the bars $c$ $c'$, &c., nearest the chuck, co-operating with the studs $b^2$ $b^3$, act as holders to prevent radial movement of the said bars out of time.

Each tool-carrying bar has at its rear end a notch, $c^x$, adapted to be entered and engaged at the proper time by an arm of the bar-moving device $c^4$, shown as a lever pivoted at 4 upon a slide, $f$, having a roll, $f^2$, (see Fig. 3,) the laterally-projecting ends of which device are struck at the proper times by suitable cams on the cam-disk $d$, the said bar-moving device being thus made to engage with one or the other of the bars $c$ $c'$ to move it forward and backward.

In the manufacture of screws, the cam-disk $d$ being rotated by the pinion $d'$ on the shaft $d^2$, it having the belt-pulley $d^3$, brings the cam-projections thereon into operation in the order of their numbering from 5 to 18, inclusive. The rod $b$ is fed forward through the chuck by a feeding device composed of a pair of spring-jaws, $e$, having cutting teeth or projections 19 near their free ends, the said jaws, substantially such as shown in the application hereinbefore referred to, being held in a longitudinally-movable slide, $e'$, guided upon the standard $b'$ in suitable ways, and adapted to slide forward and then backward in line, coinciding with the center of rotation of the chuck and the rod $b$ and in front of the said chuck and rod. This slide $e'$, located between the bars $c$ $c'$, is moved at proper times by a lever, $e^2$, (shown best in Fig. 1,) and pivoted at $e^3$ on an ear, $e^4$, fixed to the frame-work, the said lever having a roll, $c^5$, which is acted upon by the cams 13, 15, and 17, the former to move the slide $e'$ forward, so that the jaws $e$, by their inclined ends, advance upon the rotating rod $b$, and as soon as the teeth or projections 19 thereon cut a little into the surface of the said rod, making a slight annular groove, the cam 15 acts on the said lever to retract the said slide and draw out the rod $b$ for a distance equal to the length of feed required to form a screw of the desired length, the chuck being at such time loosened on the rod, after which the rod $b$ is again grasped by the chuck, and during the further backward movement of the slide $e'$ by the cam 17 the said jaws are pulled off from the end of the rod, and the feeding device is moved backward sufficiently far to be out of the way of the tool-holding bars $c$ $c'$, when they are subsequently moved forward and inward diagonally.

Referring to Figs. 1 and 2, it will be assumed that the end of the rod $b$ held and being rotated by the chuck has been acted upon by the reducing-tool 3, which has reduced the end of the rod, as in Fig. 2, to form the body of the blank to be threaded; that the bar-moving device $c^4$ has been struck by the cam 7 and turned so that its upper end engages the notch in the bar $c$, and that the threading-tool 2, fixed to the tool-carrying bar $c$, has been moved forward and inward sufficiently far by the cam 8, acting on the roll $f^2$, to place the threading-tool 2 close to the end of the said blank. Further movement of the cam-disk $d$ will cause the inner edge of the said cam 8, it yet acting on the said roll, to move the tool-carrying bar $c$ forward in a straight line far enough to force the threading-tool upon the reduced blank and thread it. The thread having been cut, the cam 9 acts upon the roll $g^3$ of the belt-shipper $g$, pivoted at $g^2$, and causes it to place the driving-belts on the fast pulley $h$ and on the loose pulley $h'$ to reverse the movement of the chuck and rod, the said belt-shipper and fast and loose pulleys being as in the said application referred to. The rotation of the chuck and rod $b$ having been started in the reverse direction, the cam 10 acts upon the roll $f^2$ of the slide $f$ and retracts the bar $c$, and withdraws the threading-tool from the threaded blank, further backward movement of the said bar $c$, by the action of the inclined portions of its slots on the studs $b^2$ $b^3$, causing the said bar to be moved diagonally backward and upward. At the completion of or during this diagonal backward movement of the bar $c$ the cam 11 strikes the roll $g^3$ of the belt-shipper and moves the belts on the said pulleys, so that the chuck and rod are again immediately started in rotation in their forward direction. The blank having been threaded, and the rod being again rotated in its forward direction, the cam 12 acts upon the end of lever $m$, (see Fig. 4,) pivoted at $m'$, and causes the parting-tool $m^2$ to be forced against the rod which separates the threaded blank from it. The cam 13 then acts on lever $e^2$ and moves the feeding device $e$ forward upon the rotating rod, as before described, and the teeth 19 having cut a small groove, the cam 14 acts on the roll 20 and moves the slide $a^7$ in the direction of the arrow on it in Fig. 2, and moves the split tube in the direction to release or unchuck the rod $b$. The rod having been released, cam 15 strikes lever $e^2$ and moves back the slide $e'$ far enough to feed the rod the distance required for the next screw to be made, when cam 16 strikes roll 20 and causes the split tube to be moved in the opposite direction to again chuck the rod, when cam 17, acting on the lever $e^2$, completes the backward movement of the slide $e'$, as before stated. Cam 18 next strikes the bar-moving device $c^4$ at its lower end, disengages it from the bar $c$, and causes it to engage the notch $c^x$ in the bar $c'$, after which the cam 5, acting on the roll $f^2$, forces the bar $c'$, having the reducing-tool 3, forward and inward diagonally, bringing the reducing-tool in line with and then forcing it upon the rotating rod to reduce its end. The end of the rod having been reduced, the cam 6 acts on roll $f^2$ to withdraw the bar $c'$, and then the cam 7 acts upon the bar-moving device $c^4$, disengages it from bar $c'$, and engages it with bar $c$, when cam 8 acts on the roll $f^2$ and moves bar $c$ forward and inward diagonally into the position, Fig. 2, which was herein assumed as the starting-point.

Instead of employing but two bars, $c\ c'$, I may employ three or four such bars, adding, however, to the machine a second bar-moving device and cams to actuate it at the proper times.

Referring to Figs. 2 and 3, where the bar-moving device is shown in engagement with the tool-carrying bar $c$, it will be understood that the bar-moving device was thrown into engagement with the bar $c$ by the cam 7 while the slide $f$ was in its most backward position. In the said figures the slide is shown partially moved forward, but it will be returned into its most backward position just before the cam 18 arrives below the lower end of the bar-moving device, and the said cam will tip the bar-moving device and cause it to be disengaged from the bar $c$ and be engaged with the bar $c'$, and just before the said cam 18, by the movement of the disk $d$, arrives opposite the backwardly-extended upper end of the bar-moving device the slide $f$ will be moved forward by the end of cam 5, so that the said cam 18 cannot strike the upper end of the bar-moving device. The cams 5 and 8 move the slide $f$ forward, and the cams 6 and 10 move it backward at the proper times to enable cams 7 and 18 to correctly operate the bar-moving device to engage one or the other bar, $c\ c'$.

I claim—

1. In a screw-cutting machine, the rotating chuck, combined with one or more reciprocating tool-carrying bars having guiding-surfaces, both inclined with relation to and parallel with the axis of rotation of the said chuck and the rod carried by it, and mechanism for operating said bars, whereby each tool-carrying bar, as it is reciprocated, has given to it a parallel and diagonal movement, as described, with relation to the axis of the chuck and rod carried by it, substantially as set forth.

2. Two or more tool-carrying bars having the described guiding-surfaces inclined and parallel with the axis of the chuck and supported, as described, to be moved forward and diagonally inward toward the axis of the chuck and backward and diagonally outward from such axis, and a chuck to rotate a rod, and means to move the said bars and chuck, combined with the reducing and threading tools and the rod-feeding mechanism, to operate substantially as set forth.

In testimony whereof I have signed my name to this specification in the presence of two subscribing witnesses.

CHARLES F. ROPER.

Witnesses:
   G. W. GREGORY,
   BERNICE J. NOYES.